United States Patent [19]
Rice et al.

[11] Patent Number: 5,867,257
[45] Date of Patent: Feb. 2, 1999

[54] BATTLEFIELD PERSONNEL THREAT DETECTION SYSTEM AND OPERATING METHOD THEREFOR

[75] Inventors: Robert R. Rice, Chesterfield; Mark S. Zediker, Florissant, both of Mo.

[73] Assignee: McDonnell Douglas Corporation, St. Louis, Mo.

[21] Appl. No.: 902,070

[22] Filed: Jul. 29, 1997

[51] Int. Cl.[6] ............................. G01P 3/36; G01C 3/08; G01S 13/00
[52] U.S. Cl. .................. 356/28.5; 356/5.09; 342/192
[58] Field of Search ............................. 356/28.5, 5.09; 342/192

[56] References Cited

U.S. PATENT DOCUMENTS

| | | | |
|---|---|---|---|
| 4,856,899 | 8/1989 | Iwaoka et al. | 356/346 |
| 5,192,979 | 3/1993 | Grage et al. | 356/28.5 |
| 5,319,434 | 6/1994 | Croteau et al. | 356/5 |
| 5,353,109 | 10/1994 | Langdon et al. | 356/28.5 |
| 5,587,785 | 12/1996 | Kato et al. | 356/28.5 |
| 5,621,514 | 4/1997 | Paranto et al. | 356/5.09 |
| 5,751,830 | 5/1998 | Hutchinson | 382/103 |

Primary Examiner—Mark Hellner
Attorney, Agent, or Firm—Westerlund & Powell, P.C.; Raymond H.J. Powell, Jr.; Robert A. Westerlund

[57] ABSTRACT

A battlefield personnel threat detection system for identifying and analyzing vibrations corresponding to an immutable characteristic of a target of interest includes a transmitter for producing a transmit laser beam by amplification of a primary coherent laser signal, a coherent receiver responsive to backscattered light produced by interaction of the transmit laser beam with the target of interest and generating data corresponding to the immutable characteristic of the target of interest, and a control and display module for analyzing the data to thereby detect the presence of the target of interest and for controlling operation of the transmitter and the receiver. The target of interest can be an enemy soldier. In the battlefield personnel threat detection system, the control and display module permits the transmitter and the receiver to operate in an agile search mode of operation in which spectra indicative of the enemy soldier are produced and a signature classification mode of operation in which the spectra are analyzed for the immutable characteristic of the enemy soldier, by which the enemy soldier can be located. A method for operating a battlefield personnel threat detection system including a micro-doppler ladar system and a signal processor is also described.

37 Claims, 3 Drawing Sheets

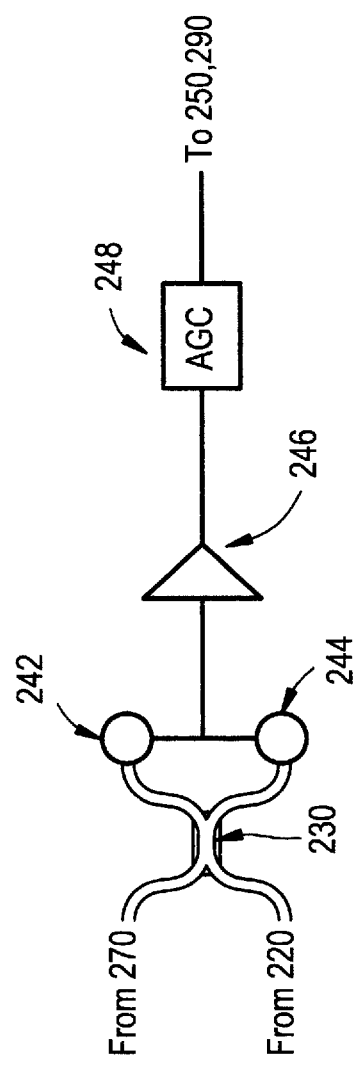

BATTLEFIELD PERSONNEL THREAT DETECTION SYSTEM AND OPERATING METHOD THEREFOR

BACKGROUND OF THE INVENTION

The present invention relates generally to battlefield personnel threat detection systems. More specifically, the present invention relates to a micro-doppler laser radar (ladar) battlefield personnel threat detection system for detecting and localizing threats to deployed personnel. According to one aspect of the present invention, the micro-doppler ladar system detects the principal threat to deployed field personnel, i.e., deployed enemy personnel. A method for employing a micro-doppler ladar system for detecting and localizing threats to deployed personnel is also disclosed.

The future battlefield will demand an increased ability to acquire, transmit, process, disseminate, and utilize surveillance and target acquisition information. One relatively new source of intelligence information is remote monitoring of the battlefield, using seismic, acoustic, and magnetic remotely monitored sensors (REMS). When enemy personnel or vehicle movement activates these remote sensors, a monitor display located behind friendly lines indicates the type of activity. The operator can derive from this display not only the enemy's presence but also such information as direction and/or speed of convoys and personnel, number of the vehicles in a convoy, and convoy composition, e.g., armored versus wheeled vehicles. REMS works on the principles of detection of an outside stimulus, logic processing of that stimulus, and transmission of a coded signal to a readout device. The tactical unattended ground sensors used by REMS may include sensors which operate on magnetic, seismic, acoustic, electromagnetic and audio detection principles. It will be appreciated that the REMS approach to perimeter monitoring requires the initial placement of several REMS, for example, geophones. Manual placement of these geophones requires use of the very personnel that REMS is intended to protect; remote placement by air drops or artillery generally alerts enemy forces to the fact that an opposing force is interested in a specific segment of the theater.

Another attempt at providing effective perimeter protection for deployed personnel involves a detection system which detects intruders using a transmission line, for example, a Goubau line, as a sensing element. The transmission line is positioned about the perimeter of the area to be protected and an antenna applies pulsed RF energy to the line. An intruder in the field of the line causes an RF reflection back toward the source, which reflection is detected by Doppler range-gating techniques. As with the geophone system mentioned above, the installation of the transmission line detection system dictates that deployed personnel be placed at risk to physically lay the transmission line.

The ability to detect the presence of an enemy soldier or hostile individual concealed within a structure, i.e., within a building or vehicle, or behind a barrier such as vegetation, can be of paramount importance both to soldiers in combat conditions and to law enforcement officials in tactical situations. For example, the detection thresholds for uniformed human targets have been established in field tests as varying between 50 and 115 feet in a semi deciduous tropical forest, with the longer detection threshold being observed near the end of the dry season when less foliage is present. The use of optical devices such as non magnifying yellow, red, and dichroic lenses as aids to personnel detection in a tropical forest has been determined to be ineffective. Although detection of hostile personnel within buildings and vehicles is possible using infrared detectors, the effectiveness of such devices varies with ambient conditions and is inversely proportional to the amount of thermal insulation provided by, for example, the building.

The consequences of failing to detect individual(s) such as illegal aliens concealed in a vehicle, a terrorist holed up in a room in a building, or a group of enemy soldiers hiding in vegetation around a landing zone, in a timely manner, can range from serious to catastrophic. Moreover, knowledge regarding the physiological status, e.g., is the target aware of detection or in a state of heightened alert, of these individuals could also be invaluable in combat and/or tactical situations. There are no conventional systems that can provide such information reliably.

It will be appreciated that such a system capable of detecting, for example, enemy soldier approaching through thick vegetation, could likewise be used monitor to the physiological state of an individual remotely. Moreover, such a postulated system could be invaluable in determining, e.g., whether a witness is lying to Congress or a court, whether a suspicious individual in a crowd or audience is likely to be a terrorist or assassin, whether a potentially suicidal person is about to jump, or whether an adversary across a bargaining table is calm or excited. No transportable system presently exists which can provide remote detection of a person's physiological status.

The problem of detecting people in hiding from a distance is central to developing reliably effective methods of countering ambushes in military operations. Techniques that depend upon detection of airborne human effluents are among those that have been considered. However, the equipment needed to identify chemical clouds or plumes which signal potential hazzards to friendly personnel has heretofore not been available. Although a $CO_2$ MTI Laser Radar for Personnel and Vehicular Detection project, whose primary goal was the construction of a feasibility model which could be tripod mounted, easily transported in the field, and yet withstand the rigors of field use without performance degradation, was initiated, the laser radar finally deployed consisted of two heavy, bulky units; a laser radar head; and power supply/control panel. Such units were never considered successful because the rigid structure of the $CO_2$ laser and its relatively cumbersome power supply, i.e., field generator, made the system transportable, not portable. It will be appreciated that the fixed frequency output wavelength of the $CO_2$ laser radar further limited the usefulness of the system.

What is needed is a system for detecting the presence of a threat to an individual based on measurement of an immutable characteristic of the threat. Moreover, what is needed is a system for detecting the presence of antagonist individuals who pose a threat to deployed soldiers or law enforcement officers. What is also needed is a system for sensing the physiological status of individuals classified as threats to friendly forces.

SUMMARY OF THE INVENTION

Based on the above and foregoing, it can be appreciated that there presently exists a need in the art for a battlefield personnel threat detection system which overcomes the above-described deficiencies. The micro-doppler threat detection system according to the present invention was motivated by a desire to overcome the drawbacks and shortcomings of the presently available technology, and thereby fulfill this need in the art.

An object of the battlefield personnel threat detection system is to provide a portable system for detecting the presence of a threat to an individual based on measurement of an immutable characteristic of the threat. According to one aspect of the present invention, the battlefield personnel threat detection system includes a micro-doppler ladar system and a digital analyzer. According to another aspect of the invention, the immutable characteristic of the threat is the vibration produced by an enemy soldier's heart and even breathing process. According to yet another aspect of the present invention, the immutable characteristic of the threat is the ground vibration produced by the footsteps of an enemy soldier.

Another object of the battlefield personnel threat detection system according to the present invention is to provide a micro-doppler ladar sensor whereby sensing is performed remotely, even at significant range. It will be appreciated that stand-off detection has enormous benefits in an armed conflict or similar engagements.

Yet another object of the battlefield personnel threat detection system according to the present invention is to provide a perimeter monitoring system which is capable of scanning for multiple threats to deployed personnel simultaneously.

A still further object of the battlefield personnel threat detection system according to the present invention is to provide a perimeter monitoring system which is both portable and robust.

A yet further object of the battlefield personnel threat detection system according to the present invention is to provide a perimeter monitoring system having a scalable architecture.

Another object of the battlefield personnel threat detection system according to the present invention is to provide a perimeter monitor system wherein the physiological or alert state of detected enemy soldiers can be determined.

These and other objects, features and advantages according to the present invention are provided by the combination of appropriate signal processing electronics and associated display with a compact micro-doppler ladar to allow the remote detection, classification, and monitoring of immutable characteristics indicative of threats to deployed personnel.

These and other objects, features and advantages according to the present invention are provided by a battlefield personnel threat detection system for identifying and analyzing vibrations corresponding to an immutable characteristic of a target of interest. Preferably, the battlefield personnel threat detection system includes a transmitter for producing a transmit laser beam by amplification of a primary laser signal, a coherent receiver responsive to backscattered light produced by interaction of the transmit laser beam with the target of interest for generating data corresponding to the immutable characteristic of the target of interest, and a control and display module for processing the data to thereby detect the presence of the target of interest and for controlling operation of the transmitter and the receiver. According to one aspect of the battlefield personnel threat detection system, the target of interest is an enemy soldier. According to another aspect of the present invention, the control and display module permits the transmitter and the receiver to operate in an agile search mode of operation in which spectra indicative of the enemy soldier are produced and a signature classification mode of operation in which the spectra are analyzed for the immutable characteristic of the enemy soldier, thereby permitting the enemy soldier to be located.

These and other objects, features and advantages according to the present invention are provided by a battlefield personnel threat detection system for identifying and analyzing vibrations corresponding to an immutable characteristic of a target of interest. Advantageously, the battlefield personnel threat detection system includes:
  a first device for producing a transmit laser beam by amplification of a coherent primary laser signal;
  a second device responsive to backscattered light produced by interaction of the transmit laser beam with a target structure for generating data corresponding to the immutable characteristic of the target of interest; and
  a third device for processing the data to thereby detect the target of interest and for controlling operation of the first and second devices.

According to one aspect of the battlefield personnel threat detection system of the present invention, the target structure is foliage. According to another aspect of the present invention, the third device controls the first and second devices to operate in an agile search mode of operation in which spectra indicative of a hazard to deployed personnel are produced and a signature acquisition mode of operation in which these spectra are analyzed for the immutable characteristic corresponding to an enemy soldier hiding within the foliage.

These and other objects, features and advantages according to the present invention are provided by a battlefield personnel threat detection system for identifying and analyzing the potential threat of a target of interest, including:
  a first device for generating a primary coherent laser signal;
  a second device for amplifying the primary coherent laser signal in an optical fiber amplifier device so as to generate a transmit laser beam;
  a third device for transmitting the transmit laser beam towards the target of interest;
  a fourth device for receiving backscattered light produced by interaction between the transmit laser beam and the target of interest and for generating an electrical signal indicative of the target of interest;
  a fifth device for determining the range of the target of interest responsive to the electrical signal;
  a sixth device for determining a physiological characteristic signature of the target of interest different from range;
  a seventh device for analyzing the physiological characteristic signature to thereby detect the target of interest; and
  an eighth device for displaying data received from the seventh device regarding the target of interest.

These and other objects, features and advantages according to the present invention are provided by a method of operating a battlefield personnel threat detection system including a micro-doppler ladar system having a transmitter and coherent receiver and a controller having a signal processor and a display for identifying and analyzing a target of interest. Preferably, the method includes steps for:
  generating a primary coherent laser signal;
  amplifying the primary coherent laser signal in an optical fiber amplifier so as to generate a transmit laser beam;
  transmitting the transmit laser beam towards the target of interest;

receiving backscattered light produced by interaction between the transmit laser beam and the target of interest and for generating an electrical signal indicative of the target of interest;

determining range responsive to the electrical signal;

ascertaining a characteristic signature of the target of interest different from range;

analyzing the characteristic signature to thereby detect the presence of the target of interest; and displaying information regarding the target of interest detected during the analyzing step.

These and other objects, features and advantages according to the present invention are provided by a battlefield personnel threat detection system including a first device for scanning a predetermined area and for generating a first signal responsive to a vibration signature indicative of a first hazard to deployed personnel within the predetermined area, a second device for scanning fixed points within the predetermined area and for generating a second signal indicative of a second hazard to the deployed personnel within the predetermined area, and a third device for alerting the deployed personnel when one of the first and second signals is generated. According to one aspect of the battlefield personnel threat detection system of the present invention, the predetermined area defines an annular ring. Preferably, the interior edge of the annular ring corresponds to a perimeter surrounding the deployed personnel.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 3 is a schematic diagram of selected components, a double-balanced receiver, in the receiver of the micro-doppler subsystem of the present invention illustrated in FIG. 2.

DETAILED DESCRIPTION OF THE PREFERRED EMBODIMENTS

Recent research studies indicate the heart beat of a living creature including man creates a pressure wave in the surrounding atmosphere that causes relatively flexible structures to mechanically deform in response. Naturally, the body of the living creature itself deforms the most in response to the beating of its heart. In one study, it was established that micro-accelerometers placed on the surfaces of vehicles or structures surrounding a subject could readily detect the mechanical deformation of the surface, even in spite of significant efforts to isolate the enclosing structure from the vibrations produced by the subject. Vibrations and motions of such magnitude can be easily sensed by micro-doppler ladar, and the use of such equipment for the remote detection and monitoring of life forms is one object of the present invention.

Figure 1:
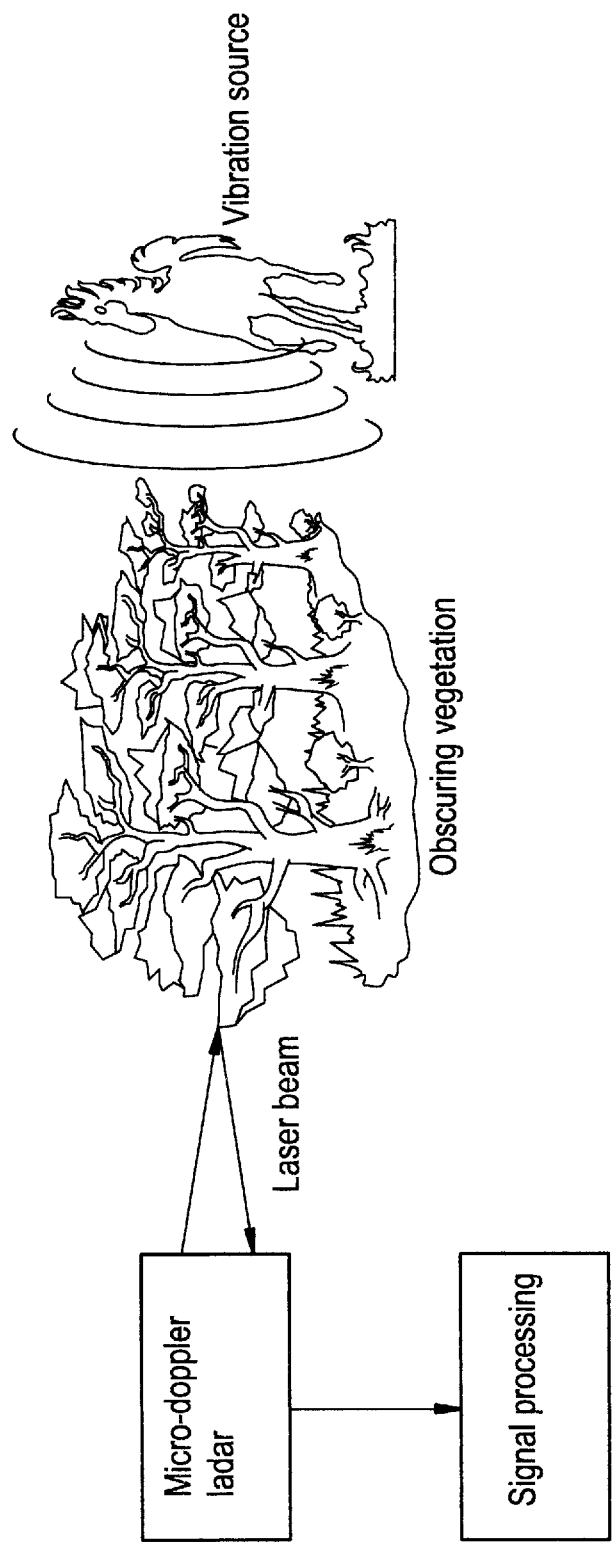
FIG. 1 is a partially block, partially representation diagram illustrating one of the novel aspects according to the present invention.

The fundamental method of implementation of the battlefield personnel threat detection system (hereinafter threat detection system or TDS) according to the present invention is illustrated in FIG. 1. A beam generated by a micro-doppler ladar transmitter included in the threat detection system, as discussed in greater detail below, impinges on the obscuring vegetation, which is perturbed by the pressure waves emanating from the animal as a result of its heartbeat. It should be noted that many obscuring structures such as foliage, frame buildings, doors, or metal vehicles advantageously will undergo motion in response to these disturbances generated by the animal, e.g., the human animal, vibration source. It will be appreciated that the amplitude of the induced response in the obscuring structure will vary widely depending upon a variety of factors, such as the geometry and the mechanical properties of the obscuring materials.

The micro-doppler ladar beam produced by the threat detection system is scattered back from the obscuring structure after being phase modulated by the induced motions as mentioned above. It should be noted that the signal processing electronics advantageously included in the threat detection system are substantially different from those that would be used to classify a military aircraft, for example, since the frequency spectrum of animal-induced mechanical disturbances will be significantly different from those generated by the rigid skin of an airframe. For example, pulse and respiration rates are typically measured in the range of a beat or so per second and a fraction of a breath per second for animals of interest. Naturally, other life forms that do not generate mechanical disturbances, i.e., heartbeats, cannot be detected by this invention.

The pressure waveform associated with a heart beat is essentially a spike which is rich in harmonics. Modern pattern recognition algorithms advantageously can be optimized to detect such waveforms even in heavy clutter.

While the battlefield personnel threat detection system does not require any particular laser technology or wavelength, one implementation is quite advantageous from a packaging perspective; this is the fiber optic micro-doppler ladar. As will be discussed in greater detail below, the micro-doppler ladar system section of the threat detection system advantageously can be operated to produce appropriate transmitted ladar waveforms, e.g., a chirped FM modulation laser beam, which could be employed in estimating the range to the target disturbance for perimeter surveillance applications, for example.

A micro-doppler ladar system works by transmitting a highly coherent signal to a remote target that phase modulates the back-reflected light. Additional details regarding micro-doppler ladar systems in general are presented in commonly-assigned, co-pending U.S. application Ser. No. 08/782,175 (filed Jan. 14, 1997), which application is incorporated herein by reference for all purposes. The back scattered light from the target of interest is detected by a coherent receiver that recovers the induced phase modulation and hence the vibration spectrum of the target. The nature of the target can be classified by comparing its vibration spectrum with reference spectra stored in a vibration spectrum database.

The threat detection system according to the present invention uses a fiber optic technology under development for an entirely different application to enable operation in the near-infrared, where sensitivity is better than available for current $CO_2$ technology, but where high power laser sources have previously been considered problematic. In this wavelength region, the battlefield personnel threat detection system provides significant innovative benefits as compared to alternative implementations using diode pumped solid state laser sources, for example. It should be noted that the significant laser power level produced by the battlefield personnel threat detection system advantageously permits increased resolution for marginal detection situations, thus precluding the use of other, low power micro-doppler ladar system alternatives. It should also be noted that in situations not requiring high ladar transmitter power, diode pumped solid state lasers could suffice; both types of systems are considered to be within the scope of the present invention. Thus, it will be appreciated that the laser power level, and hence the range, of the battlefield personnel threat detection system according to the present invention is scalable.

A detailed explanation of the battlefield personnel threat detection system according to the present invention, which advantageously includes a micro-doppler ladar subsystem and a waveform analyzer subsystem, is presented below by reference to FIG. 2.

Figure 2:
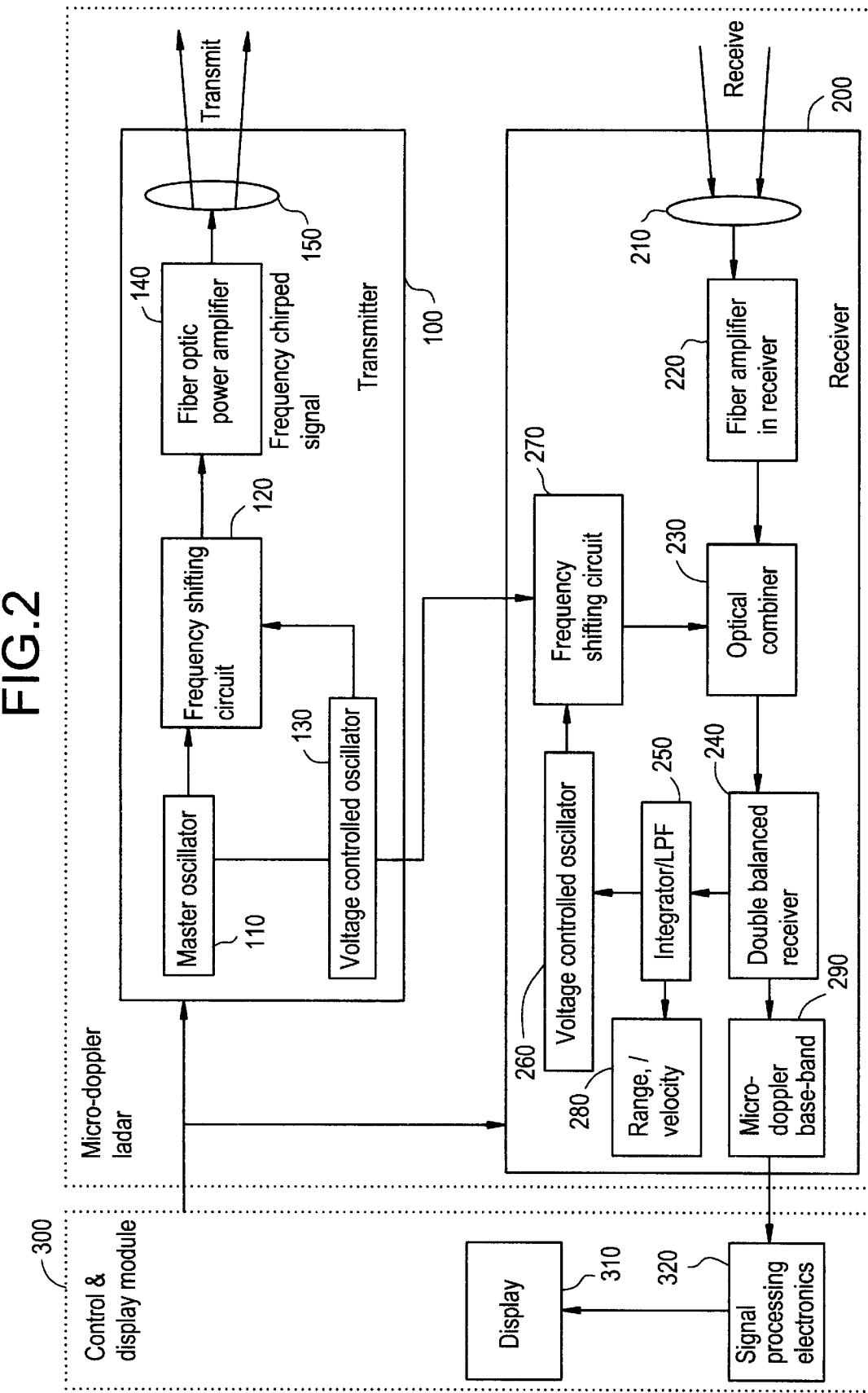
FIG. 2 is a high-level block diagram of a battlefield personnel threat detector system.

A preferred embodiment according to the present invention is illustrated in FIG. 2, wherein a battlefield personnel threat detection system includes a fiber optic micro-doppler ladar system, which in turn includes a transmitter 100 and a receiver 200, both of which are preferably controlled by a control and display module 300. Advantageously, the module 300 can include a computer, microcomputer or dedicated microprocessor for controlling the transmitter 100 and receiver 200 during predetermined first and second operating modes, as discussed in greater detail below.

In exemplary transmitter 100, a master oscillator (MO) 110 is connected to a fiber optic power amplifier 140 via a frequency shifting (FS) circuit 120, which FS circuit receives a modulation frequency signal produced by a voltage controlled oscillator 130. Preferably, master oscillator 110 is a stable, very narrow linewidth, laser, which is operating in a $TEM_{00}$ mode at a frequency within the gain spectrum of the power amplifier 140 and which is coupled by optical fiber to deliver a continuous wave signal to downstream components in the transmitter 100. It will be appreciated that the master oscillator laser 110 can be any conventional master oscillator laser; preferably, the master oscillator is a fiber laser oscillator. It should also be mentioned that some conventional components that are understood to be part of any practical fiber optic ladar system have been omitted from the drawings and detailed description of the preferred embodiment of the present invention so as not to obscure the fundamental features of the invention. For example, one of ordinary skill in this particular art would appreciate that an optical isolator would be located immediately downstream of the master oscillator 110 to prevent feedback from downstream components, e.g., power amplifier 140, that would induce instability in the master oscillator 110. The details of such components are well known to those skilled in the art and will not be discussed further.

Preferably, MO 110 generates a first signal with a coherence time $T_c$, where:

$$T_c = 1_c/c = 2\pi/\Delta\Omega, \quad (1)$$

where $1_c$ is the coherence length and $\Delta\Omega$ is the linewidth of the laser beam. The first signal is preferably delivered to FS circuit 120, which performs a frequency translation or shifting function. The FS circuit 120 beneficially can be a photonic network or any one of several conventional devices such as an acousto-optic modulator. In any case, the frequency of the output signal $\Omega_{out}(t)$ is translated up or down from the unmodulated carrier signal $\Omega_0$ produced by the MO 110 by the frequency $\Omega_{vco}(t)$ of the VCO 130.

In other words, the output signal of FS circuit 120 can be determined from the expression:

$$\Omega_{out}(t) = \Omega_0 + \Omega_{vco}(t). \quad (2)$$

This frequency translation advantageously permits transmission of a frequency chirp on the output signal to establish an estimate of range to target, as discussed in further detail below. It should be mentioned that the output signal of VCO 130 is a sawtooth function which, in an exemplary case, varies continuously from 10 to 100 and then back to 10 megahertz (MHZ). The sawtooth characteristic of the VCO 130 output was selected to minimize the stimulated Brillouin scattering (SBS) associated with power amplifier 140. It will be appreciated that suppression of SBS enables generation of a high power laser output beam with minimum beam degradation. It will also be appreciated that SBS can also be suppressed by limiting the length of the fiber amplifier and by optical isolators to suppress the backwards traveling SBS wave. These latter-mentioned design constraints do not require that the master oscillator (MO) frequency be modulated in suppressing SBS and are preferred for that reason; SBS in higher power systems advantageously can be minimized either by applying the above-mentioned design constraints or by modulating MO output beam.

It should also be mentioned that the use of fiber optic power amplifier 140 to produce a high-power output signal is one of the novel aspects of the preferred embodiments according to the present invention. In contrast, the NASA Wind Doppler Ladar system proposed the use of optical fibers for providing alignment and coupling functions; amplification devices in the NASA Doppler Ladar system are not constructed using optical fibers.

As noted previously, a single fiber power amplifier 140 will suffice for some short range applications. However, a coherent array of optical fiber amplifiers collectively forming the fiber optic power amplifier 140 is particularly advantageous for those specific applications involving very long range or atmospheric conditions involving significant absorption or dispersion of the transmitted laser beam. A preferred embodiment of a coherent phased array of fiber optic amplifiers suitable for use in the present invention for generating high-power laser beams needed for long range ladar system applications is described in exacting detail in co-pending, commonly assigned U.S. patent application Ser. Nos. 08/471,870 and 08/611,474, which applications are incorporated herein by reference for all purposes.

Still referring to FIG. 2, the transmit optics 150 beneficially could be an optical lens (as shown), although a mirror, or an array of lensed fibers in a phased array could also be used. The function of the transmit optics 150 is to collimate the high-power $TEM_{00}$ signal from the fiber optic power amplifier 140 and to direct the collimated beam towards a distant target. Preferably, the transmit optics 150 is gimbal mounted so as to permit training of the transmitted laser beam to sweep a portion of the sky, i.e., a range of azimuth and elevation values, using a predetermined sweep pattern.

The receive optics 210, which advantageously can be the same optics as the transmit optics 150 used to transmit the output beam, collect back-scattered light from the distant target and couple it into a single mode diode pumped fiber optic preamplifier 220. For ease of explanation, the transmit optics 150 and the receive optics 210 are shown separately in FIG. 2. The function of the preamplifier 220 is to amplify the received signal to a higher, more convenient optical signal level and to enhance the signal-to-noise (SNR) of the receiver. It should be noted that while preamplifier 220 is not strictly required if the Double Balanced Receiver (DBR) 240 achieves signal-shot-noise-limited performance, it does provide a degree of margin and robustness for the phase-locked loop (PLL) acquisition function performed in the receiver 200.

As discussed in greater detail below, components in ladar receiver 200 including an optical combiner 230, the DBR 240, an integrator/low pass filter (integrator/LPF) 250, a second voltage controlled oscillator 260 and a second FS circuit 270 advantageously form a PLL in the receiver 200.

In FIG. 2, the optical combiner 230 connected between preamplifier 220 and DBR 240 advantageously can be a 3 dB fiber optic coupler, which linearly combines a frequency translated sample of the Master Oscillator signal generated by FS circuit 270 with the received signal and delivers equal amplitude combined signals to two photodiode detectors 242, 244 in DBR 240, as illustrated in FIG. 3. The optical signal at one detector can be represented by the equation:

$$A_{det} = A_{mp} \cos\left[(\Omega_0+\Omega_{vc2})t+\phi_0\right] + A_r \cos\left[(\Omega_0+\Omega_{vc1})(t-\tau) + \sigma(t-\tau/2)\right] \quad (3)$$

where $\delta(t-\tau/2)$ represents the phase modulation of the transmitter signal induced by the vibrations of the target and is given by $\delta(t-\tau/2)=2\Omega_0\Delta x(t-\tau/2)/c$, where $\Delta x(t-\tau/2)$ is the vibrational displacement of the target. In a double balanced receiver 240, two such output signals are combined in a difference amplifier 246 that allows rejection of amplitude noise from the Master Oscillator 110. It will be appreciated that this technique is well known in the field of telecommunications and will not be discussed in any greater detail.

Advantageously, the DBR 240 can include an automatic gain control circuit 248 to insure that the output of DBR 240 is suitable for further processing in I/LPF 250 and the micro-doppler baseband detector 290. It will be noted that the output of micro-doppler baseband detector 290 corresponds to the vibrational signature of the target while the output of I/LPF 250 permits extraction of both range and velocity, as discussed in greater detail below. It should be mentioned that I/LPF 250 beneficially can include filters for separating targets into various categories based on their doppler characteristic. For example, limiting target analysis to targets having a maximum doppler shift would avoid needless evaluation of rapidly moving objects. Thus, doppler filtering prior to analysis of a stationary object such as a fixed rock outcrop could avoid analysis of birds flying in the vicinity of the rock outcrop. It will be appreciated that the vibrations induced in the rock outcrop advantageously can be analyzed to detect movement indicative of enemy ground troops and moving vehicles traveling in the vicinity.

In order to recover the translational and micro-doppler information from the backscattered laser return, a frequency-translated sample of the Master Oscillator is phase locked to the received signal. The FS circuit 270 in the receiver 200 translates the Master Oscillator frequency to $\Omega_{10}=\Omega_0+\Omega_{vc2}$ and this signal is used as the local oscillator signal provided to the optical mixer 230. The combination of the local oscillator signal and the received signal preferably is provided to double balanced receiver 240. The frequency $\Omega_{vc2}$ output by the VCO 260 is controlled by the phase locked loop electronics so that the derived local oscillator signal tracks the received signal in phase. The AC component of detected photocurrent at each of the photodetectors 242, 244 in double-balanced receiver 240 is given by the equation:

$$i_s = K A_{mo} A_r \cos\left[(\Omega_{vc2}-\Omega_{vc1})t+\Omega_0\tau+\phi_0-\sigma(t-\tau/2)\right] \quad (4)$$

It should be noted that the term $\Omega_0\tau$ contains the translational doppler information, where $\tau=2R/c=2(R_0-vt)/c$, where $R_0$ is the range and $v$ is the closing velocity of the target. It will also be appreciated that the translational doppler frequency is therefore expressed as $\Omega_d=-2\Omega_0 v/c$, which can be tracked out by the phase-locked loop in the receiver, i.e., the loop essentially drives the output of each of the balanced detectors to the same amplitude and, in effect, sets $\Omega_{vc2}-\Omega_{vc1}=\Omega_d+\Omega_{\mu d}$, and hence the closing velocity is obtained from the mean value of the loop control voltage using range-velocity processing and display circuitry 280, which circuitry is well known to those of ordinary skill in the art and will not be discussed further. The micro-doppler signal is obtained by the micro-doppler baseband circuitry 290 from the AC component of the loop voltage when the loop is locked and tracking the net doppler frequency shift of the received signal. For a vibrational frequency of Wtvib the micro-doppler phase term above would be expressed as $2\Omega_0\Delta x \cos \Omega(t-\tau/2)/c$, which will be recovered as a component $\Omega_{\mu d}$ on the loop control voltage.

It should be mentioned that there are alternative methods for recovering the translational and micro-doppler signals; these are considered variants of the present invention. For example, it will be noted that the micro-doppler ladar system according to the preferred illustrated in FIG. 2 is a homodyne system where a single master oscillator 110 advantageously can be used in both the transmitter 100 and the receiver 200. In an alternative embodiment according to the present invention, a heterodyne ladar system advantageously can employ first and second master oscillators 110a, 110b to generate the transmitted laser beam and to recover the backscattered laser beam, respectively.

Still referring to FIG. 2, the control and display module 300 advantageously can be coupled to transmitter 100 and receiver 200 so as to permit the transmitter and receiver to be operated in first and second modes of operation during analysis of a target of interest. It will be appreciated that gross analysis of velocity and range can be performed using the chirped frequency transmit laser beam. However, the chirped frequency transmit laser beam may not be well suited to fine analysis of the vibration produced by the target or induced in the target by outside threats. Therefore, in the preferred embodiment of FIG. 2, the VCO 130 is operated until a gross range and velocity for the target of interest can be obtained or until other information, which will be discussed in detail below, can be obtained. During a second mode of operation, the VCO 130 is turned OFF, which permits the PLL (elements 230, 240, 250, 260 and 270) in receiver 200 to settle and, thus, provides a better environment for vibration signature extraction. The chirped frequency is preferably selected so as to minimize SBS degradation in the transmit laser beam of transmitter 100.

Advantageously, the present invention is not limited to systems for obtaining vibration signatures of objects; other parametric signatures advantageously can be obtained. Moreover, it will be appreciated that techniques that depend upon detection of chemical signatures, i.e., hazardous chemicals, to signal a threat to personnel, while previously proposed, heretofore have not been practical because the equipment needed to identify chemical clouds or plumes which signal potential hazzards to friendly personnel has not been available. The battlefield personnel threat detection system operating in the chirped frequency, i.e., agile search, mode of operation, produces sufficient discrete frequencies in the near IR spectrum to produce reliable absorption spectra. It will be appreciated that these spectra advantageously can be analyzed and classified by the signal processing electronics 320. The result of this analysis preferably is presented on display 310. Thus, the battlefield personnel threat detection system according to the present invention advantageously can be operated to scan for chemical clouds indicative of the hazards to deployed personnel. Advantageously, the signal processing electronics 320 can include several parallel processors so that the system can scan for multiple threats to deployed personnel simultaneously.

It should also be understood that the present invention is not limited to fiber optic ladar systems but may include any remote vibration sensing system for which a clear line of sight is available to the target. As mentioned above, a significant application is in the remote sensing of target vibrations for non-cooperative target classification, damage assessment and intelligence gathering. Thus, the battlefield personnel threat detection system according to the present invention advantageously can be used to measure the vibrational spectrum of bridges, buildings, pipelines, pumps, taxiing aircraft, volcanoes, and such. The data obtained can reveal the mechanical status of machinery and structures for a variety of purposes. For example, the vibrations induce in a bridge are indicative of the vehicular traffic on the bridge. However, the principal purpose of the battlefield personnel threat detection system is to obtain the vital signs of a remotely located person or animal, e.g., the vital signs of deployed friendly personnel, the vital signs indicative of the location and disposition of enemy personnel, or the vital signal of a witness during testimony, as previously discussed.

The present invention was conceived as a result of analysis of the performance and performance limitations of the present 10.6 $\mu$m $CO_2$ system now under development in connection with the Radiant Mist program. While the sensitivity benefit of implementing a micro-doppler laser radar system at a shorter wavelength is obvious, no suitable sources, especially for the region between 1.06 $\mu$m and 2.05 $\mu$m, were available in the past. The potential availability of sufficient power from a rare-earth-doped single mode fiber amplifier for the micro-doppler application was not considered feasible prior to studies by the inventors that led to the High Power Fiber Optic Laser program. The advantages of a fiber optic micro-doppler laser radar system with respect to efficiency, performance, and packaging are unique. Moreover, the addition of the above-mentioned control and display module 300 to analyze and identify immutable physiological characteristics of, for example, enemy personnel is considered a novel adaptation of micro-doppler laser radar system.

In short, the battlefield personnel threat detection system according to the present invention includes a generic fiber optic laser embodiment of a micro-doppler ladar subsystem providing a signal to the display and control module 300. The Master Oscillator 110 represents a stable, very narrow linewidth, laser operating in a TEM00 mode at a frequency within the gain spectrum of the power amplifier 140 that is coupled to an optical fiber to deliver signal to subsequent components, i.e., optical element 150, in the transmitter 100. The voltage-controlled oscillator (VCO) 130 generates a signal with a coherence time $T_c$ that is delivered to the frequency shifting (FS) circuit 120, which performs a frequency translation. The frequency of the output signal $\Omega_{out}$ is translated up or down from the unmodulated carrier $\Omega_0$ by the frequency $\Omega_{vco}$ of the VCO 130, that is, $\Omega_{out}=\Omega_0+\Omega_{vc1}$. This frequency translation permits transmitting a frequency chirp on the output signal to establish range by a well known ranging technique. The transmit optics 150 collimate the output TEM00 signal from the amplifier 140 and direct the beam toward the remote target (not shown).

As noted before, a single fiber amplifier will suffice for some short range applications, but a coherent array of fiber amplifiers advantageously can be provided for those applications involving very long range. Additional details regarding single fiber laser amplifiers are provided in commonly-assigned, co-pending U.S. application Ser. Nos. 08/471,870 and 08/611,474, which applications are incorporated herein by reference for all purposes. For the bulk of applications, relatively low laser power levels, achievable from a single fiber, may well suffice.

In the receiver 200 of FIG. 2, the receive optics 210 collect the back-scattered light from the target and couple it into a single mode diode pumped fiber preamplifier 220, which amplifies the received signal to a higher, more convenient level and establishes the signal-to-noise (SNR) for the receiver 200. Optical combiner 230 linearly combines a frequency-translated sample of the signal from master oscillator 110 with the received signal output from preamplifier 220 and delivers the combined signal to the double balanced receiver 240. Within the double balanced receiver, two output signals are combined in a difference amplifier that allows rejection of amplitude noise on the master oscillator 110; the technique is well known in the field of telecommunications.

In order to recover the translational and micro-doppler information, a frequency-translated sample from the master oscillator 110 is phase locked to the received signal. The FS circuit 270 in the receiver 200 translates the VCO frequency to $\Omega_{10}=\Omega_0+\Omega_{VC^1}$ and this signal is used as the local oscillator for the double balanced receiver 240. The frequency $\Omega_{vc1}$ of the second FS circuit is controlled by the phase locked loop electronics so that the derived local oscillator signal tracks the received signal in phase.

The AC component of detected photocurrent at the photodetectors 242, 244 is given by:

$$I_s=KA_m\alpha A_r \cos\{(\Omega_{VC^1}-\Omega_{vc^1})t+\Omega_0 t+f_0-d(t-t/2)\} \quad (5)$$

It will be appreciated that the term $\Omega_0$ t contains any translational doppler information, as might be expected were the system installed on a moving vehicle or interrogating a moving vehicle. It will also be noted that t=2R/c=2($R_0$−vt)/c, where $R_0$ is the range and v is the closing velocity. The translational doppler frequency is therefore $\Omega_d=-2\Omega_0 v/c$, which can be tracked out by the phase-locked loop in the receiver (i.e., the loop essentially drives the output of each of the balanced detectors to the same amplitude and, in effect, sets $\Omega_{VC1}-\Omega_{vc^1}=\Omega_d+\Omega_m^d$) and, hence, the closing velocity is obtained from the mean value of the loop control voltage. The micro-doppler signal is obtained from the AC component of the loop voltage when the loop is locked and tracking the net doppler frequency shift of the received signal. For a vibrational frequency of $\Omega_{vib}$, the micro-doppler phase term above would be 2 $\Omega_0$Dx cos $\Omega_{vib}$(t−t/2)/c, which will be recovered as a component at $\Omega_{md}$ on the loop control voltage.

It should be mentioned at this point that there are alternative methods to recover the translational and micro-doppler signals. These alternative methods and techniques are considered to be simple variants of the preferred fiber optic implementation of a micro-doppler ladar system and will be familiar to those of ordinary skill in the art.

The section 300 of the block diagram in FIG. 2 labeled "control and display module" advantageously includes the signal processing electronics 320 and the display 310. The baseband micro-doppler signal generated in the micro-doppler baseband circuit 290 contains the information needed to quantify and classify threats to deployed personnel in the field detected by the microdoppler ladar subsystem. Preferably, the received signal is analyzed for the presence of heart beat signatures and secondarily for respiration so as to identify enemy personnel. The net microdoppler signal advantageously can be resolved into a superposition of one or more individual signatures depending on the SNR and clutter level of the signal generated by circuit 290.

The analysis beneficially can be performed by comparing signal spectra with reference samples stored in vibration signature/spectra databases. Processing the signal using a Neural Network or other artificial intelligence (AI) technique implemented in the signal processing electronics 320 is also considered to be within the scope of the present invention.

It will be recalled that the information being sought is the number of individuals within the field of interest and their physiological states. Depending upon the threat detection system SNR, much can be inferred, e.g., the physical training status of the individuals and their levels of arousal, from the analysis of the received vibration spectra. The information advantageously can be displayed for interpretation on the display unit 310. It will be noted that the battlefield personnel threat detection system can be operated to either point at individual target areas or scan an area of interest. The display 310 advantageously can be optimized to suit the needs of specific applications.

It should again be noted that some conventional components are omitted, e.g., the optical isolator needed to prevent feedback from downstream components that would induce instability in the master oscillator. It will be appreciated that one of ordinary skill in the art is conversant with the details of such components and further discussion of these components is omitted in the interest of brevity.

In an effort to reduce the detectability of an enemy soldier under field conditions using currently available visual and electro-optical methods, several dyes have been integrated into military equipment to assist the soldier in blending in with the anticipated background. Recent studies indicate that this approach would likely be inefficacious against the battlefield personnel threat detection system since it relies on phase modulation of backscattered light produced by vibrations induced in a target for detection and not on target contrast as observed with an imaging sensor. Moreover, the battlefield personnel threat detection system, in its first operating mode, i.e., the agile search operating mode, advantageously produces a broad range of near IR wavelengths, permitting the reliable production of one or more strongly backscattered wavelengths useful in identifying enemy personnel in camouflage uniforms.

The advantages of a micro-doppler ladar sensor employed as a battlefield personnel threat detection system over the use of mechanically contacted probes or sensors are profound. Using the micro-doppler ladar sensor, the sensing is performed remotely, preferably at a significant range. Stand-off detection has enormous benefit in an armed conflict or similar engagements. Such timely threat information can literally determine the outcome in modem special forces operations. In urban warfare, knowledge of an enemy hiding behind a door or wall could well mean the difference between life and death. Moreover, an infiltrating force can be covertly detected in surrounding jungles or vegetation with the battlefield personnel threat detection system and appropriate action taken. Moreover, the ability to scan remotely from points of concealment has significant advantages over placing sensors with fixed wires or data links.

Furthermore, the ability of the battlefield personnel threat detection system to determine the vital signs of an enemy once that enemy has been located provides another level of protection for friendly forces. The vital signs of an enemy can reveal his state of readiness, or signal when he becomes aware of a threat. Knowledge of the physiological state of an individual can be invaluable in many practical situations as mentioned above. In addition, the ability to monitor the physiological state of an individual finds use in applications other than combat and/or police actions. Such applications advantageously range from monitoring audience reaction to a speech, sensing the state of arousal of a terrorist in a hostage situation, or judging the truthfulness of a witness in a congressional witch hunt.

Clearly, the micro-doppler ladar sensor and associated signal processing electronics included in the battlefield personnel threat detection system advantageously can address all these applications and more. For example, the medical applications are potentially very valuable, e.g., measuring the propagation of the pulse pressure wave through the body could be used to provide an indication of the elasticity of the veins and arteries, or detect blockages, all without attaching cumbersome and annoying sensors to the patient. Microscopic muscular responses, such as in subvocalization or contemplated movements, might also be detected and interpreted. The use of a sensitive micro-doppler ladar sensor and associated signal analyzer for remotely detecting and monitoring the physiological characteristics of living organisms has very significant potential applications.

The applications for the battlefield personnel threat detection system according to the present invention include any remote detection or monitoring requirement for which a clear line of sight is available to the target or appropriate structures in the vicinity of the target. Such applications include sensing infiltrators in darkness or foliage, such as around military facilities, in hostile areas or likewise sensitive installations. For special forces applications, a portable system advantageously can be employed to detect enemy personnel in rooms, behind doors, or in other locations of concealment. In the battlefield, the location and status of friendly and hostile personnel preferably is obtained by a scanning unit on a BFV, for example. Under ideal conditions, the battlefield personnel threat detection system can be used to obtain information reflecting the vital signs of a wounded soldier down on the battlefield. The alert status of sentries would be extremely valuable information for some covert operations.

In the civilian arena, sensing the presence of individuals in restricted areas is an important application. The ability to detect a concealed criminal would be of high value to police officers participating in raids or SWAT operations. Locating victims in fires where smoke renders visibility poor or nonexistent is another valuable application of the present invention. Likewise, the ability to search for individuals lost in the woods would be facilitated by the present invention as an alternative to passive infrared, which cannot see beneath dense foliage.

An interesting application would be as a non-contact lie detector for monitoring the performance of witnesses before panels or a court. The pulse and respiration of the subject could be highly revealing. Monitoring suspicious individuals in crowds or in the lines at customs and passport control could provide valuable alerts. Police officers approaching a stopped vehicle might be warned of a hazard from a potential felon. Moreover, the battlefield personnel threat detection system advantageously could be used to detect the subvocalizations made by persons in a stopped vehicle, thus providing law enforcement personnel with another indication of personal danger.

In the area of medical applications, the use of the battlefield personnel threat detection system as a remote sensor for pulse measurement would allow detailed studies of blood flow in the extremities or determination of the elastic condition of veins and arteries. Monitoring the pulse and respiration of inaccessible individuals, for example, trapped in a flood, or about to leap from a ledge, could provide invaluable information to rescue personnel in an emergency situation. It will be appreciated that there are many more potential military, civilian, and medical applications that are feasible, and all are considered within the scope of the invention.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A battlefield personnel threat detection system for identifying and analyzing vibrations corresponding to an immutable characteristic of a target of interest, comprising:
   a transmitter for producing a transmit laser beam by amplification of a primary coherent laser signal;
   a coherent receiver responsive to backscattered light produced by interaction of said transmit laser beam with the target of interest and generating data corresponding to the immutable characteristic of the target of interest; and
   a control and display module for processing said data to thereby detect the presence of the target of interest and for controlling operation of said transmitter and said receiver,
   wherein said control and display module permits said transmitter and said receiver to operate in an agile search mode of operation in which spectra indicative of the target of interest are produced and a signature classification mode of operation in which said immutable characteristic of the target of interest is analyzed.

2. The battlefield personnel threat detection system as recited in claim 1, wherein the target of interest is an enemy soldier.

3. The battlefield personnel threat detection system as recited in claim 2, wherein said spectra correspond to vibrations generated by said enemy soldier and wherein said immutable characteristic corresponds to the heartbeat of said enemy soldier.

4. The battlefield personnel threat detection system as recited in claim 2, wherein said spectra correspond to vibrations generated by said enemy soldier and wherein said immutable characteristic corresponds to the heartbeat and respiration process of said enemy soldier.

5. The battlefield personnel threat detection system as recited in claim 2, wherein said transmit laser beam generated during said agile search mode of operation is a chirped frequency transmit laser beam and wherein said transmit laser beam generated during said signature classification mode of operation is a mono-frequency transmit laser beam.

6. The battlefield personnel threat detection system as recited in claim 1, wherein said control and display module permits said transmitter and said receiver to operate in an agile search mode of operation in which spectra indicative of a non-living hazard to the deployed personnel are produced and a signature classification mode of operation in which said immutable characteristic of the target of interest is analyzed, seriatum.

7. The battlefield personnel threat detection system as recited in claim 6, wherein said immutable characteristic of the target of interest corresponds to the heartbeat and respiration process of an enemy soldier.

8. The battlefield personnel threat detection system as recited in claim 6, wherein said immutable characteristic of the target of interest corresponds to vibrations produced by footsteps of an enemy soldier.

9. The battlefield personnel threat detection system as recited in claim 1, wherein said immutable characteristic of the target of interest corresponds to at least one of the heartbeat and the respiration process of an enemy soldier.

10. The battlefield personnel threat detection system as recited in claim 1, wherein said control and display module comprises:
    a signal processing electronic portion for analyzing said data corresponding to the immutable characteristic of the target of interest; and
    a display for displaying indications of targets of interest identified by said signal processing electronic portion.

11. A battlefield personnel threat detection system for identifying and analyzing vibrations corresponding to an immutable characteristic of a target of interest, comprising:
    first means for producing a transmit laser beam by amplification of a primary coherent laser signal;
    second means responsive to backscattered light produced by interaction of said transmit laser beam with an intervening structure for generating data corresponding to the immutable characteristic of the target of interest; and
    third means for processing said data to thereby detect the target of interest and for controlling operation of said first and second means.

12. The battlefield personnel threat detection system as recited in claim 11, wherein the target of interest is an enemy soldier, wherein said intervening structure comprises foliage, and wherein said third means controls said first and second means to operate in an agile search mode of operation in which spectra indicative of said enemy soldier are produced and a signature classification mode of operation in which the immutable characteristic corresponding to said enemy soldier is detected within said foliage.

13. The battlefield personnel threat detection system as recited in claim 11, wherein the target of interest is an enemy soldier, wherein said intervening structure comprises a building, and wherein said third means controls said first and second means to operate in an agile search mode of operation in which spectra indicative of said enemy soldier are produced and a signature classification mode of operation in which the immutable characteristic of said enemy soldier is analyzed responsive to vibrations in a least one element of said building.

14. The battlefield personnel threat detection system as recited in claim 11, wherein the target of interest is an enemy soldier, wherein said intervening structure comprises a rigid natural object, and wherein said third means controls said first and second means to operate in an agile search mode of operation in which spectra indicative of said enemy soldier are produced and a signature classification mode of operation in which the immutable characteristic of said enemy soldier responsive to vibrations in said rigid natural object.

15. The battlefield personnel threat detection system as recited in claim 11, wherein said intervening structure comprises foliage and wherein said third means controls said first and second means to operate in an agile search mode of operation in which spectra indicative of a hazard to deployed personnel are produced and a signature classification mode of operation in which said spectra are analyzed for the immutable characteristic corresponding to an enemy soldier within said foliage.

16. The battlefield personnel threat detection system as recited in claim 11, wherein said intervening structure comprises a building and wherein said third means controls said first and second means to operate in an agile search mode of operation in which spectra indicative of a hazard to deployed personnel are produced and a signature classification mode of operation in which said spectra are analyzed for the immutable characteristic corresponding to an enemy soldier induced in vibrations in a least one element of said building.

17. The battlefield personnel threat detection system as recited in claim 11, wherein said intervening structure comprises a rigid natural object, and wherein said third means controls said first and second means to operate in an agile search mode of operation in which spectra indicative of a hazard to deployed personnel are produced and a signature classification mode of operation in which said spectra are analyzed for the vibrations characteristic of footsteps of an enemy soldier.

18. The micro-doppler ladar system as recited in claim 11, wherein the immutable characteristic of the target of interest corresponds to at least one of the heartbeat and the respiration process of an enemy soldier.

19. The battlefield personnel threat detection system as recited in claim 11, wherein said first means comprises a transmitter for producing said transmit laser beam by amplification of said primary coherent laser signal in an optical fiber amplifier and wherein said second means comprises an optical fiber pre-amplifier for amplifying said backscattered light.

20. The battlefield personnel threat detection system as recited in claim 11, wherein said third means comprises:

fourth means for analyzing said data corresponding to the immutable characteristic of the target of interest; and fifth means for displaying indications of any targets of interest identified by said fourth means.

21. A battlefield personnel threat detection system for identifying and analyzing the potential threat of a target of interest, comprising:

first means for generating a primary coherent laser signal;

second means for amplifying said primary coherent laser signal in an optical fiber amplifier means so as to generate a transmit laser beam;

third means for transmitting said transmit laser beam towards the target of interest;

fourth means for receiving backscattered light produced by interaction between said transmit laser beam and the target of interest and for generating an electrical signal indicative of the target of interest;

fifth means for determining range of the target of interest responsive to said electrical signal;

sixth means for determining a physiological characteristic signature of the target of interest different from range;

seventh means for analyzing said physiological characteristic signature to thereby evaluate said target of interest; and eighth means for displaying data regarding said target of interest.

22. The battlefield personnel threat detection system as recited in claim 21, wherein at least one parameter of said transmit laser beam varies so as to permit said first through sixth means to operate in a target acquisition mode of operation wherein range data and hazard spectra are produced by said fifth means and a signature classification mode of operation wherein said physiological characteristic signature is determined by said sixth means.

23. The battlefield personnel threat detection system as recited in claim 22, wherein said seventh means analyzes said hazard spectra for heartbeat induced vibrations indicative of enemy soldiers.

24. The battlefield personnel threat detection system as recited in claim 22, wherein said seventh means analyzes said hazard spectra for vibrations indicative of walking enemy soldiers.

25. The battlefield personnel threat detection system as recited in claim 22, wherein said seventh means analyzes said hazard spectra for vibrations indicative of enemy vehicular traffic.

26. The battlefield personnel threat detection system as recited in claim 22, wherein said seventh means analyzes said hazard spectra for heartbeat induced vibrations indicative of enemy soldiers, for vibrations indicative of walking enemy soldiers, and for vibrations indicative of enemy vehicular traffic, simultaneously.

27. The battlefield personnel threat detection system as recited in claim 22, wherein said seventh means analyzes said physiological characteristic signature for vibration patterns indicative of a plurality of enemy soldiers.

28. The battlefield personnel threat detection system as recited in claim 21, wherein said seventh means analyzes said physiological characteristic signature for vibration patterns indicative of at least one of the heartbeat and the respiration process of an enemy soldier.

29. The battlefield personnel threat detection system as recited in claim 21, wherein said seventh means comprises a neural network.

30. A method of operating a battlefield personnel threat detection system including a micro-doppler ladar system having a transmitter and coherent receiver and a controller having a signal processor and a display for identifying and analyzing a target of interest, the method comprising the steps of:

generating a primary coherent laser signal;

amplifying said primary coherent laser signal in an optical fiber amplifier so as to generate a transmit laser beam;

transmitting said transmit laser beam towards the target of interest;

receiving backscattered light produced by interaction between said transmit laser beam and the target of interest and for generating an electrical signal indicative of the target of interest;

determining range responsive to said electrical signal;

ascertaining a characteristic signature of the target of interest different from range;

analyzing said characteristic signature to thereby detect the presence of said target of interest; and displaying information regarding said target of interest detected during said analyzing step.

31. The method for operating a battlefield personnel threat detection system as recited in claim 30, wherein:

the generating step comprises the step of generating said primary coherent laser signal and switching repeatedly between first and second frequency characteristics;

the determining step further comprises the step of determining range and at least one hazard spectrum responsive to said electrical signal;

the determining step is performed while said primary coherent laser signal exhibits said first frequency characteristic; and the ascertaining step is performed while said primary coherent laser signal exhibits said second frequency characteristic.

32. The method for operating a battlefield personnel threat detection system as recited in claim 31, wherein said characteristic signature is a heartbeat.

33. The method for operating a battlefield personnel threat detection system as recited in claim 31, wherein said hazard spectrum corresponds to a vibration signature of a known hazard with respect to deployed soldiers.

34. The method for operating a battlefield personnel threat detection system as recited in claim 30, wherein said characteristic signature is a heartbeat.

35. A battlefield personnel threat detection system comprising:

first means for scanning a predetermined area and for generating a first signal responsive to a vibration signature indicative of a hazard to deployed personnel within said predetermined area;

second means for scanning fixed points within the predetermined area and for generating a second signal indicative of a second hazard to the deployed personnel within the predetermined area; and third means for alerting said deployed personnel when one of said first and second signals is generated.

36. The battlefield personnel threat detection system as recited in claim 35, wherein said first and said second means simultaneously scan said predetermined area.

37. The battlefield personnel threat detection system as recited in claim 35, wherein said predetermined area comprises an annular ring and wherein the interior edge of said annular ring corresponds to a perimeter surrounding said deployed personnel.

\* \* \* \* \*